W. M. BROWN.
INK WELL FOR DESKS.
No. 11,197. Reissued Oct. 13, 1891.
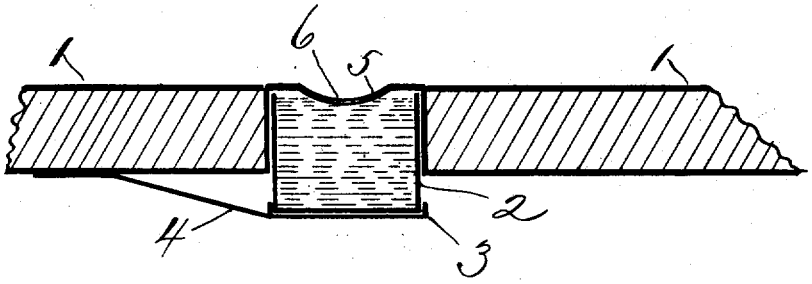
Witnesses:
J. F. Harris.
A. M. Turner.
Inventor:
Walter Morton Brown.
THE NORRIS PETERS CO., PHOTO-LITHO., WASHINGTON, D. C.

UNITED STATES PATENT OFFICE.

WALTER MORTON BROWN, OF ALBANY, NEW YORK.

INK-WELL FOR DESKS.

SPECIFICATION forming part of Reissued Letters Patent No. 11,197, dated October 13, 1891.

Original No. 434,015, dated August 12, 1890. Application for reissue filed March 16, 1891. Serial No. 385,307.

*To all whom it may concern:*

Be it known that I, WALTER MORTON BROWN, a citizen of the United States, residing at Albany, in the county of Albany and State of New York, have invented certain new and useful Improvements in Ink-Wells for Desks; and I do hereby declare that the following is a full, clear, and exact description of the invention, that will enable others skilled in the art to which it appertains to make and use the same, reference being had to the accompanying drawing, and to the figures of reference marked thereon, which forms a part of this specification.

The object of my invention is to provide an ink-well for desks, tables, &c., especially for schools, that will be easily made and prevent, as far as possible, the evaporation of the ink, and one so constructed that when being filled the ink will absolutely indicate when enough has been placed in the well, although the well itself is not in view, and one in which no part of the cover shall protrude above the level of the desk-top at any time, whether the well is in use or not, and in which the cover is permanently immovable, having no swinging or rising or falling parts.

In the drawing the figure shows a vertical sectional view of a desk-top, an ink-well cover having a depression in it and an opening through it, and an ink-well the upper edge or mouth of which is forced to contact with the under side of the cover by the elasticity of a spring, the depression in the cover sinking into the mouth of the ink-well.

The numeral 1 shows the desk-top; 2, the ink-well; 3, cup set on the free end of a spring, in which the ink-well rests; 4, spring to hold ink-well in contact with the cover; 5, cover with a depression in it; 6, opening in cover to allow of the pen being dipped in the ink-well.

A full description is as follows: The ink-well is preferably made of glass and preferably has a wide mouth. A spring is preferably used, whereby the well is made to enter the opening in the under side of the desk upwardly, and its upward movement is preferably stopped by coming in direct contact with the under side of the cover; and the ink-well is preferably set in a cup on the end of the spring, and the other end is attached to the desk in any well-known manner. The cover is preferably made of glass or metal, and if metal is used C-grade five per cent. aluminum-bronze is preferred, because of its non-corrosive qualities. This cover has a depression at or near its center and is preferably cup-shaped, as shown, and this depression is made so that when the mouth of the well is forced or held against the bottom of the cover the depression will enter or sink into the mouth of the well and the lowest point in the depression caused to lie below the extreme top of the ink-well. At the lowest point in the depression in the cover, preferably, an opening is made to pass a pen through and into the ink-well.

The cover is preferably made a trifle larger than the opening in the desk, so that when the cover is entered therein considerable force will be necessary to squeeze it into place, and it will be thus held there; but it may be fastened in any manner.

In setting the cover in the opening in the desk-top the entire upper surface is left flush with or below the top surface of the desk that the free use of the desk-top shall not be impeded, and the cover is preferably made so as to be immovable—*i. e.*, it is permanently fastened in its opening, but so as to be unattached to the ink-well or any of its parts—and it has no swinging or rising and falling parts necessary to be swung round or raised or lowered in order to operate the well. If desired, a cork may be placed in the pen-hole; but its upper end should never rise above the top surface of the cover or desk.

The operation is as follows: The ink-well being in position with its cover, as shown, the well is charged by pouring the ink through the hole in the cover, preferably, and as the ink-well fills before the ink can rise and flow over the sides of the well and into the desk it must first rise through the pen-hole in the cover and fill the cup-like depression in the cover, and the person filling the well seeing the ink rising through the pen-hole will know that the well is filled as much as it should be, the cover with its depression being, therefore, a visible alarm to warn any one to cease filling the well. When the well is thus filled, the edge of the mouth is pressed tightly against the bottom side of the cover and the well at that point effectually closed, and as there is but a small opening in the cover, notwithstanding it is or may be constantly open, evaporation of the ink takes place with extreme slowness.

As there are no movable parts to the cover it is noiseless, and the cover is never in the way and never obstructs the free use of the desk-top, whether the ink-well is in or out of use.

When the well needs cleaning, the spring is bent down, the well removed and cleansed and put back into place.

Having fully described my invention, what I claim is—

1. An ink-well entered upwardly in an opening in a desk or table from the under side of said opening and removably retained there by upward pressure continuously applied from below the table or desk top and having a stationary cover entered in an opening in the desk or table, the entire upper surface of said cover lying permanently flush with or below the top surface of the desk or table top, said cover having a depression in it adapted to sink into the mouth of the well and having an opening therein, substantially as described.

2. The combination, with a desk or table having an opening in it, of an ink-well and cover, the cover having a depression in it and an opening therein, said cover being permanently secured in the opening, the upper surface of said cover being permanently flush with or below the top surface of said desk that the top thereof may be free from obstruction on account of said cover, said ink-well being entered in said opening upwardly from the under side of said desk or table and retained there and in such manner that the depression in the cover will sink into the mouth of the well, as and for the purposes as herein substantially described.

3. An ink-well entered and removably held in an opening in a desk-top and a cover therefor, said cover having an opening therein that a pen may be dipped into the well, said cover being attached to the desk and its upper surface flush with or below the upper surface of the desk-top that the desk-top may not be obstructed thereby, as and for the purposes shown and described.

4. An ink-well entered and removably held in an opening in a desk-top and a cover therefor, said cover having a depression in it and an opening therein, said cover being attached to the desk-top and its upper surface permanently flush with the upper surface of the desk-top that the free use of the desk-top may not be obstructed thereby, the depression sinking into the mouth of the well, substantially as described.

5. An ink-well entered and removably held in an opening in a desk-top and a cover therefor, said cover having a depression in it and an uncovered opening therein, said cover being attached to the desk-top and its upper surface permanently flush with the upper surface of the desk-top that said top may not be obstructed thereby, the depression sinking into the mouth of the well, substantially as herein described.

6. A desk-top having an ink-well cover with a pen-hole through it, said cover being attached to the desk-top and its upper surface permanently flush with or below the upper surface of the desk-top, substantially as described.

In testimony whereof I affix my signature in presence of two witnesses.

WALTER MORTON BROWN.

Witnesses:
J. F. HARRIS,
H. V. SCATTERGOOD.